United States Patent
Kroner et al.

(10) Patent No.: US 10,007,633 B2
(45) Date of Patent: Jun. 26, 2018

(54) FIELD BUS COUPLER FOR CONNECTING INPUT/OUTPUT MODULES TO A FIELD BUS, AND METHOD OF OPERATION FOR A FIELD BUS COUPLER

(71) Applicant: Weidmueller Interface GmbH & Co. KG, Detmold (DE)

(72) Inventors: Michael Kroner, Oerlinghausen (DE); Bjoern Griese, Paderborn (DE)

(73) Assignee: Weidmueller Interface GmbH & Co. KG (DE)

( * ) Notice: Subject to any disclaimer, the term of this patent is extended or adjusted under 35 U.S.C. 154(b) by 122 days.

(21) Appl. No.: 14/898,399

(22) PCT Filed: May 28, 2014

(86) PCT No.: PCT/EP2014/061076
§ 371 (c)(1),
(2) Date: Dec. 14, 2015

(87) PCT Pub. No.: WO2014/206680
PCT Pub. Date: Dec. 31, 2014

(65) Prior Publication Data
US 2016/0147695 A1 May 26, 2016

(30) Foreign Application Priority Data
Jun. 24, 2013 (DE) .................... 10 2013 106 572

(51) Int. Cl.
*G06F 13/36* (2006.01)
*G06F 13/40* (2006.01)
(Continued)

(52) U.S. Cl.
CPC ..... *G06F 13/4027* (2013.01); *G05B 19/0425* (2013.01); *G06F 13/4221* (2013.01);
(Continued)

(58) Field of Classification Search
None
See application file for complete search history.

(56) References Cited

U.S. PATENT DOCUMENTS 6,788,980 B1 * 9/2004 Johnson ............... G05B 19/042
700/1
2003/0093460 A1 * 5/2003 Kinney ................. H04L 29/06
709/202

(Continued)

FOREIGN PATENT DOCUMENTS

WO 2006/128396 A1 12/2006

*Primary Examiner* — Henry Tsai
*Assistant Examiner* — Aurangzeb Hassan
(74) *Attorney, Agent, or Firm* — Laubscher, Spendlove & Laubscher, P.C.

(57) ABSTRACT

A method and apparatus for operating a field bus coupler in a normal operating mode to connect at least one input/output module with the control computer of an industrial automation system, including receiving from the control computer via a field bus a control output value that is transmitted via a sub-bus to the at least one input/output module, and receiving from the at least one input/output module via a sub-bus a control input value that is transmitted via the field bus to the control computer. During a diagnostic mode, the apparatus is operable to assign to the at least one input/output module via the sub-bus at least one desired diagnostic output value, and to assign to the control computer via the field bus at least one desired input value.

7 Claims, 1 Drawing Sheet

(51) Int. Cl.
    *H04L 12/26*     (2006.01)
    *H04L 12/40*     (2006.01)
    *H04L 12/24*     (2006.01)
    *G05B 19/042*     (2006.01)
    *H04L 12/46*     (2006.01)
    *G06F 13/42*     (2006.01)

(52) U.S. Cl.
    CPC .... *H04L 12/40032* (2013.01); *H04L 12/4625* (2013.01); *H04L 41/0803* (2013.01); *H04L 43/50* (2013.01); *G06F 13/4022* (2013.01); *G06F 13/4059* (2013.01)

(56) References Cited

U.S. PATENT DOCUMENTS

| | | | | |
|---|---|---|---|---|
| 2006/0058847 | A1* | 3/2006 | Lenz | G01K 1/024 607/5 |
| 2006/0284596 | A1* | 12/2006 | Albers | G06F 13/4027 320/116 |
| 2008/0106272 | A1* | 5/2008 | Maier | F15B 15/2869 324/644 |
| 2010/0135311 | A1* | 6/2010 | Schneider | H04L 12/40006 370/402 |
| 2011/0055448 | A1* | 3/2011 | Henkel | G06F 13/385 710/305 |

\* cited by examiner

FIELD BUS COUPLER FOR CONNECTING INPUT/OUTPUT MODULES TO A FIELD BUS, AND METHOD OF OPERATION FOR A FIELD BUS COUPLER

REFERENCE TO RELATED APPLICATIONS

This application is a national stage application under 35 C.F.R. § 371 of the PCT International Application No. PCT/EP2014/061076 filed May 28, 2014, which claims priority of the German application No. DE 10 2013 106 572.4 filed Jun. 24, 2013.

BACKGROUND OF THE INVENTION

Field of the Invention

A field bus coupler, and method, operable in a normal mode for connecting an input/output module to the field bus of a control computer, and in a diagnostic mode for sending diagnostic values to the control computer and to the input/output module.

Description of Related Art

In industrial automation systems, field buses for transmitting control data and/or measured values between one or more central control computers, also called master computers or programmable logic controllers (PLC), and field devices are interchanged. Field devices include input and output modules, for example, hereinafter abbreviated to I/O (input/output) modules, which provide analog and/or digital input and/or output channels via which system components can be controlled and via which measured values, for example from sensors, can be read in. Frequently, rather than being connected to the fieldbus directly, each individual field device is connected thereto via a field bus coupler, which acts as a data interface between the fieldbus on one side and an often proprietary sub-bus on the other. A multiplicity of bus-capable modules, for example the stated I/O modules, can be coupled to the sub-bus.

A field bus coupler of this type, also called a field bus gateway, is generally also used for configuring the connected modules. For this purpose, a web server is frequently provided in the field bus coupler, via which the field bus coupler itself along with the connected modules are configured using a web browser which is run in an external (service) computer. The field bus coupler usually comprises for this purpose a service interface, for example a USB (universal serial bus) data interface, via which the field bus coupler can be configured on site, for example by a service technician.

When the industrial automation system is operating, the field bus coupler receives output values for the individual I/O modules via the field bus, and forwards these via the sub-bus to the corresponding I/O module, which adjusts its output channels accordingly. Conversely, signals that have been analyzed by the I/O module, for example sensor signals, are converted to input values and are transmitted via the sub-bus to the field bus coupler. The field bus coupler forwards the input values via the field bus to the higher level control system.

During start up or during a diagnostic search in a system of this type, it is frequently helpful or essential to define specific output values for an output channel of an I/O module independently of the actual program sequence of the control program and/or to be capable of testing a reaction of the control program to certain input signals, even if these input signals are not present at the time. For this purpose, the control program is usually modified periodically, to allow specific output values to be defined independently of the actual program sequence. Similarly, it is standard practice during a diagnostic search to periodically set variables of the control program which reflect input values that have been read in to a desired value manually by inputting a corresponding program command, in order to enable the continued program sequence for said input value to be simulated. In many development environments for control programs, a so-called debugging mode is also provided, which can be used to set variables to desired values. An alternative procedure for specifying input signals involves connecting an adjustable current or voltage source, with which specific sensor signals can be simulated, to an input channel of an I/O module rather than to an input channel of a sensor.

However, manipulating a control program, whether manually or via a development system, is costly and also involves the risk that the control program may be altered beyond the desired manipulations. Moreover, when a system is being placed in operation, a control program that can be manipulated is not yet available or is not yet fully available. Using an adjustable current source or voltage source in place of a sensor requires rewiring.

The present invention was developed to provide a method by which a diagnostic search can be carried out in a remote I/O system without requiring that a control program that is ordinarily used must be manipulated for this purpose, and without requiring periodic rewiring.

SUMMARY OF THE INVENTION

Accordingly, a primary object of the present invention is to provide a method and apparatus for operating a field bus coupler in a normal operating mode to connect at least one input/output module with the control computer of an industrial automation system, including receiving from the control computer via a field bus a control output value that is transmitted via a sub-bus to the at least one input/output module, and receiving from the at least one input/output module via a sub-bus a control input value that is transmitted via the field bus to the control computer. During a diagnostic mode, the apparatus is operable to assign to the at least one input/output module via the sub-bus at least one desired diagnostic output value, and to assign to the control computer via the field bus at least one desired input value.

According to method of the invention, in a normal operating mode, an output value for an output channel of at least one I/O module is received via the field bus and is forwarded via the sub-bus to the input/output module, or that an input value is received from the at least one I/O module via the sub-bus and is forwarded via the field bus. The method is characterized in that, in a diagnostic mode, the fieldbus coupler transmits at least one desired output value for the output channel of the at least one I/O module via the sub-bus to the I/O module, and/or assigns at least one desired input value to the at least one I/O module, and outputs said value via the field bus.

In the diagnostic mode of the field bus coupler, a desired diagnostic output value is provided to the I/O module via the sub-bus. in place of the output value that has been received via the field bus. This is carried out regardless of whether any output value has been received and regardless of the value of any output value that may have been received. This enables the user, e.g. a service technician, to set a desired output channel to the desired output value, independently of any control program that may be running on a control computer and independently of whether the fieldbus coupler is even connected via a fieldbus to such a control computer.

In the diagnostic mode, it is likewise provided to assign a desired diagnostic input value to this input channel via the field bus, independently of an applied input signal to which an actual input value corresponds, and to transmit this diagnostic input value in place of the actual input value. This enables the user to specify a desired input value for the input channel in question to the control program in the control computer and in this sense to simulate an input signal, thereby allowing the user to control the reaction of the control program to said input value, for example. No manipulation of the control program and/or the wiring of the I/O modules is required, either for defining a desired output value or for simulating a desired input value.

It can further be provided that the diagnostic mode involves specific output channels and/or input channels of the at least one input/output module, while output and/or input values of other output channels and/or input channels are transmitted according to normal operation between the field bus and the sub-bus. In this manner, individual input or output values can be manipulated for testing purposes while a system is in operation.

In an advantageous embodiment of the method, the desired diagnostic output value and/or the desire diagnostic input value are transmitted to the fieldbus coupler via a service port by means of a web server that is run in the field bus coupler. The web server preferably also supplies a web page via the service port, which web page has input fields for the desired output value and/or for the desired input value to be simulated. The service port can be a USB port provided on the field bus coupler, for example. A selection can also preferably be made via the web server or the web page between normal operating mode and diagnostic operating mode. The desired output and/or input values can be defined by means of the web server conveniently, e.g. on-site using a service computer, without having to provide costly input means (e.g. keyboard and display) on the fieldbus coupler. The web server can also be used for additional purposes, for example, for configuration.

A field bus coupler according to the invention is configured for implementing a method of this type, for example said coupler comprises a control unit having a control program, which carries out a method of this type during a process. The stated advantages are obtained in connection with the method.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
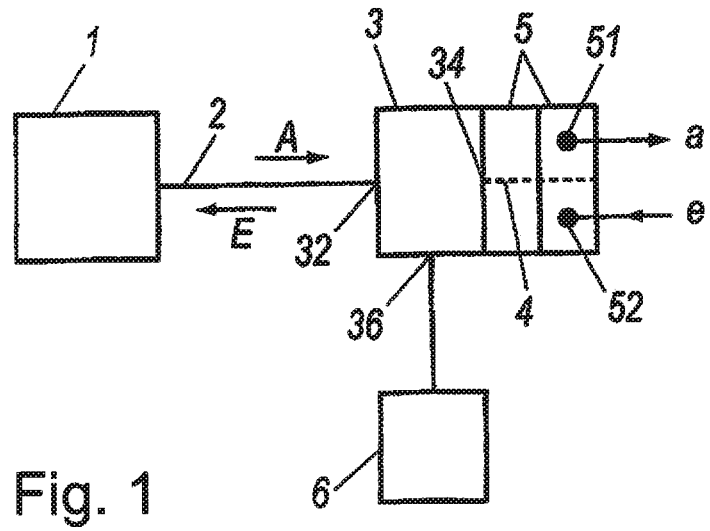
FIG. 1 is a block diagram of an industrial automation system using the field bus coupler of the present invention.

Referring first more particularly to FIG. 1, an industrial automation system includes a control computer 1 connected via a field bus 2 to a field bus coupler 3 for exchanging data with said coupler. The field bus can be configured according to a known standard, such as PROFIBUS, PROFINET, EtherCAT or CANopen, for example.

Field bus coupler 3 transmits data exchanged via field bus 2 to a serial sub-bus 4, via which I/O modules 5 are coupled to field bus coupler 3. In addition to sub-bus 4, which in this embodiment serves only to transmit data, an additional bus, not shown here, for supplying power to I/O modules 5 and/or to fieldbus coupler 3 may be provided. In that case, power supply modules for feeding in power are also provided, which can be arranged at the end of the arrangement of I/O modules 5 shown, or between I/O modules 5, or between field bus coupler 3 and I/O modules 5. In addition to the I/O modules 5 shown, additional functional modules may also be connected with field bus coupler 3, for example signal converters or interface modules.

For one of the I/O modules 5 shown, terminals of an input and an output channel, an output terminal 51 and an input terminal 52, are shown by way of example. An output signal a can be output at output terminal 51. Output signal a can be an analog or digital signal at a preset or adjustable output voltage or at an output current. Output signal a can likewise be understood as a terminal pair of a relay contact, via which an output current can be connected. At input terminal 52, an input signal e can be applied, which, like output signal a, can be an analog or digital voltage, current and/or resistance signal. Of course, the number of precisely one output terminal 51 and precisely one input terminal 52 in I/O module 5 is merely an example. The number of output terminals and input terminals and therefore of output and input channels is arbitrary.

When fieldbus coupler 3 is in a normal operating mode, it receives an output value A via fieldbus 2, which it then forwards to the I/O module via sub-bus 4. I/O module 5 then outputs an output signal a at the corresponding output terminal 51, the level of said signal corresponding to the indicated output value A. Conversely, an input signal e which is applied to input terminal 52 is converted by I/O module 5 to an input value E, which is sent via sub-bus 4 to fieldbus coupler 3, which transmits said input value E via fieldbus 2 to control computer 1.

Fieldbus coupler 3 also has a service port 36, via which it is connected to a service computer 6. Service port 36 may be configured based on the USB standard, for example.

Figure 2:
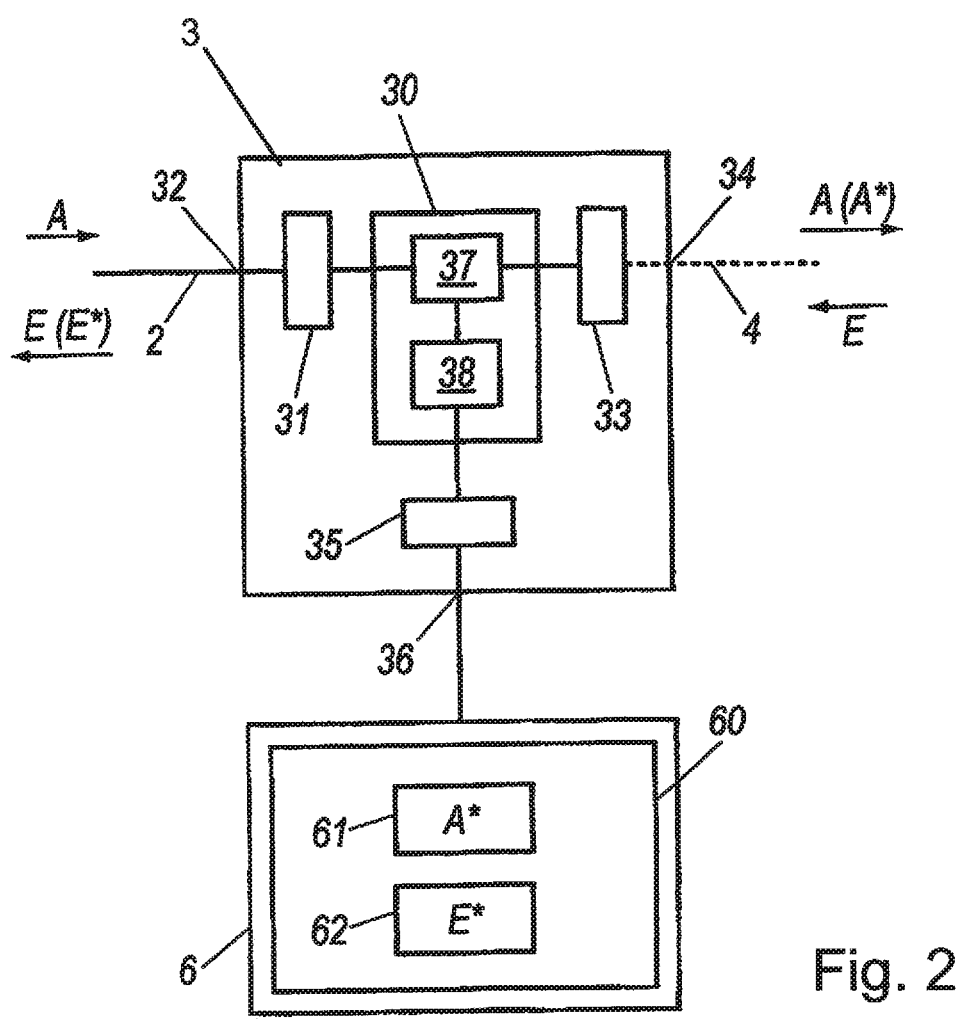
FIG. 2 is a block diagram of the field bus coupler of FIG. 1.

FIG. 2 shows a schematic block diagram detailing the configuration of a fieldbus coupler 3 according to the application. The central component of field bus coupler 3 is a control unit 30, for example a microcontroller. Control unit 30 is connected via a field bus interface 31 to field bus port 32 and thereby to field bus 2, and is connected via a sub-bus interface 33 to sub-bus port 34 and thereby to sub-bus 4. Control unit 30 is configured by means of a control program 37 to forward data received via field bus 2 to sub-bus 4, and conversely to transmit data received from sub-bus 4 and forward it via field bus 2.

For connecting to service port 36 and thereby to service computer 6, a service bus interface 35 is also provided, which is likewise connected to control unit 30. If a USB connection is used between field bus coupler 3 and service computer 6, service port 36 is also referred to as a USB interface and service bus interface 35 is referred to as a USB controller.

When field bus coupler 3 is in a normal operating mode, control unit 30 forwards output values A received via field bus 2 to the corresponding I/O module 5 via sub-bus 4, likewise as output values A, as described in reference to FIG. 1. Similarly, input values E received via sub-bus 4 are forwarded as input values E via field bus 2.

In a diagnostic operating mode, according to the present invention, this operation is different for at least one output channel and/or for at least one input channel. For this purpose, fieldbus coupler 3 has a web server 38, which is run, for example, as a program within control unit 30. Web server 38 supplies information based on the http protocol (hypertext transfer protocol) via service port 36, which information can be used to display a web page in a web browser 60 which is running on service computer 6. This web page has at least one input field for an output value 61 and/or one input field for an input value 62. A person using the service computer 6 can input values into these fields, in this case an input value E* and an output value A*, for example. The web browser makes the values that are input accessible to web server 38 via service port 36.

When field bus coupler 3 is in the diagnostic mode, it is then provided for output value A*, which has been input into input field 61 for the output value, to be forwarded via sub-bus 4 to I/O module 5 in place of output value A, which was received via field bus 2. In FIG. 2, this is indicated by the values placed between parentheses. The values are substituted independently of whether any output value A for said output terminal 51 has even been received via field bus 2, and independently of the value of any output value A that may have been received. The person using the service computer 6 is thus able to set a desired output channel to the desired output value A*, independently of a control program that is running on control computer 1 and independently of whether field bus coupler 3 is even connected via a field bus 2 to such a control computer.

In the diagnostic mode, the desired diagnostic input value E* that has been input into input field 62 is assigned to this input channel via field bus 2, independently of an input signal e which is applied to input terminal 52 and to which an actual input value E corresponds, and to transmit this desired diagnostic input value in place of input value E. A person using service computer 6 can thereby specify a desired diagnostic input value E* for the relevant input channel to the control program in control computer 1, and in this sense simulate an input signal, thereby controlling the reaction of the control program to said diagnostic input value E*, for example.

It can also be provided that all other output channels in the relevant I/O module 5 or also in other I/O modules continue to use the values that were set by control computer 1 via field bus 2. It is also possible for all additional input values that are read into other input terminals of I/O module 5 or into other input terminals to be forwarded via field bus 2 to control computer 1. Alternatively, it can be provided that, in the diagnostic mode, only those values that are set in the corresponding fields in web browser 60 are transmitted, with default values, for example zero, being assumed for values that are not set.

The described function for setting desired diagnostic input and output values E*, A* can be one of several functions of web server 38. The web server can also be used for known configuration and protocol purposes. Since the setting of output values in particular, but also the definition of input values involve the risk of malfunction in the system that is being controlled, the function according to the application may be protected against unauthorized use by specific security features. For example, the web page that provides the input fields 61, 62 may be accessible only following specific authentication procedures.

While in accordance with the provisions of the Patent Statutes the preferred forms and embodiments of the invention have been illustrated and described, it will be apparent to those skilled in the art that changes may be made without deviating from the invention described above.

What is claimed is:

1. A method for operating a field bus coupler to connect at least one input/output module via a sub-bus to a field bus of a control computer of an industrial automation system, comprising the steps of
    (1) operating the field bus coupler in a normal operating mode, including the steps of
        (a) receiving a control output value from the control computer field bus;
        (b) transmitting the control output value from the control computer field bus coupler via the sub-bus to the at least one input/output module;
        (c) receiving a control input value from the at least one input/output module via the sub-bus; and
        (d) transmitting the control input value to the control computer via the sub-bus; and
    (2) operating the field bus coupler in a diagnostic mode, including the steps of
        (a) assigning a desired output value to the at least one input/output module via the field bus coupler and the sub-bus; and
        (b) assigning a desired input value to the control computer via the field bus coupler and the field bus, wherein the diagnostic mode utilizes certain output channels and input channels of the at least one input/output module, while output values and input values of other output channels and/or input channels are transmitted according to normal operation between the field bus and the sub-bus.

2. The method for operating a field bus coupler as defined in claim 1, and further comprising the step of transmitting each of the desired output and input values to the input/output module and to the control computer, respectively, via a service port and a web server within the field bus coupler.

3. The method for operating a field bus coupler as defined in claim 2, wherein the web server within the field bus coupler provides a web page having output and input fields for the definable output and input values from a service computer via the service port.

4. The method for operating a field bus coupler as defined in claim 3, wherein selection between the normal and diagnostic conditions is effected by the web server.

5. A field bus coupler for connecting at least one input/output module with a field bus of a control computer of an industrial automation system, comprising:
    (a) a field bus coupler including in a normal operating mode:
        (1) a field bus port connected with the control computer via a field bus;
        (2) a module sub-bus port connected with the at least one input/output module via a sub-bus;
        (3) said field bus coupler being operable to transmit from the control computer to the at least one input/output module a control output value via the field bus, said field bus port, said field bus coupler, said sub-bus port and said sub-bus;
        (4) said field bus coupler being operable to transmit from the at least one input/output module to the control computer a control input value via the sub-bus, said sub-bus port, said field bus coupler, said field bus port, and said field bus;
        (5) a control program device connected between said field bus port and said module sub-bus port; and
        (6) a web server device connected between a service port and the control program device; and
    (b) said field bus coupler further including in a diagnostic mode said service port operable to assign (1) a desired diagnostic output value to the at least one input/output module via said field bus coupler, said module sub-bus port, and said sub-bus; and
(2) a desired diagnostic input value to the control computer via said field bus coupler, said field bus port, and said field bus.

6. A field bus coupler as defined in claim 5, wherein said field bus coupler further includes in the diagnostic mode:
(3) a service computer having a web page browser for supplying said diagnostic output and input values to said service port; and
(4) a web server for supplying said diagnostic output and input values from said service port to said sub-bus port, and from said service port to the field bus, respectively.

7. A field bus coupler as defined in claim 6, wherein said service port is a USB interface.

* * * * *